June 6, 1950     R. W. ANDREASSON     2,510,203
DRILLING DEVICE
Filed May 17, 1946     2 Sheets-Sheet 2
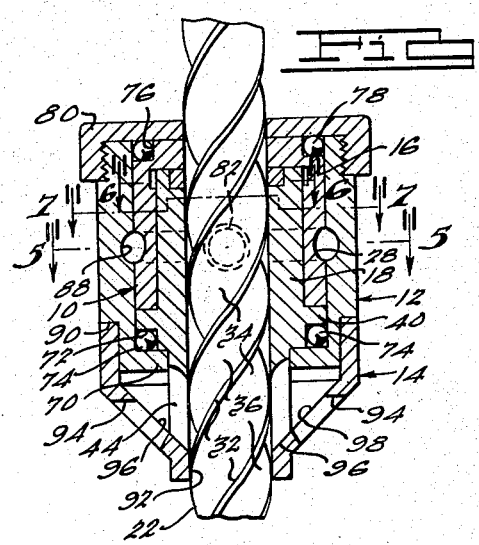
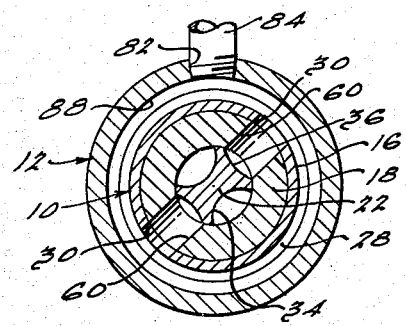
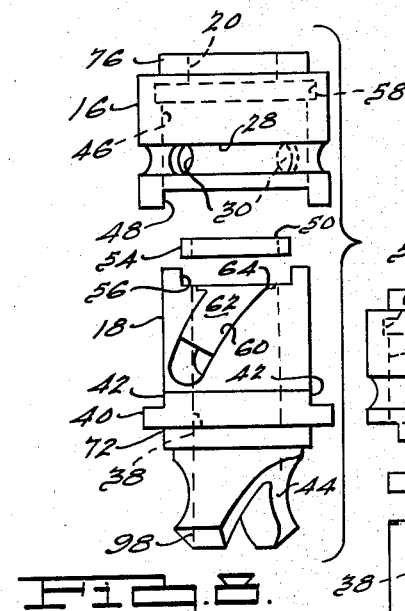
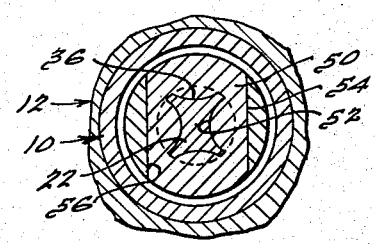
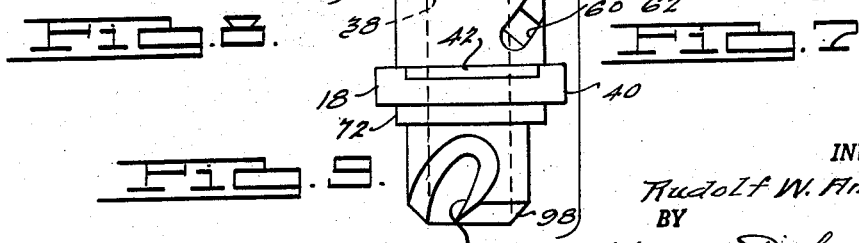
INVENTOR.
Rudolf W. Andreasson
BY
ATTORNEYS.

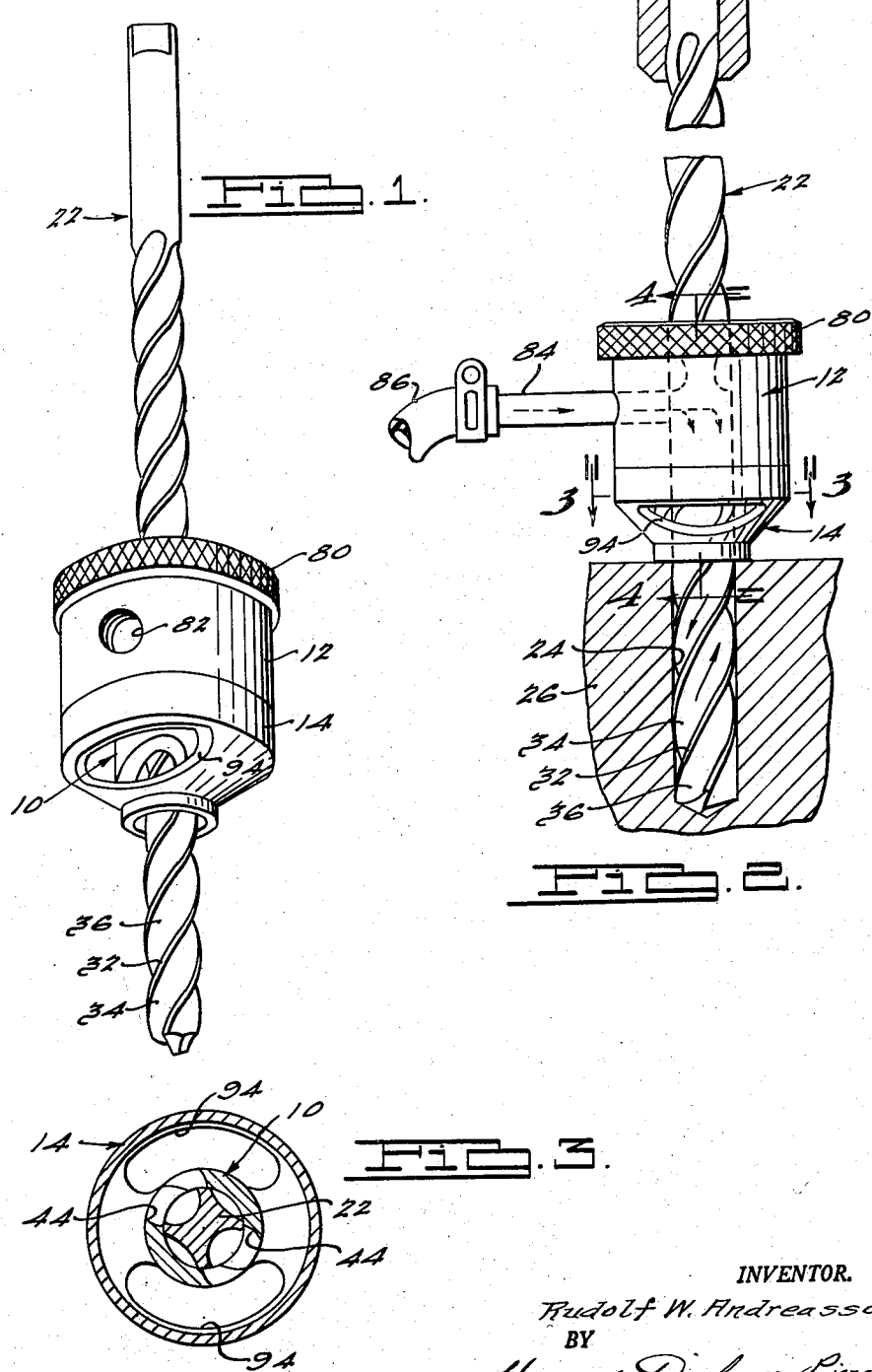

Patented June 6, 1950

2,510,203

UNITED STATES PATENT OFFICE 2,510,203

DRILLING DEVICE

Rudolf W. Andreasson, Franklin, Mich.

Application May 17, 1946, Serial No. 670,327

10 Claims. (Cl. 77—55)

1

This invention relates to drilling devices and particularly to devices employed in connection with drills enabling the effect of oil hole drills to be obtained without actually having passages completely imbedded within the drills for the passage of oil, cutting compound or the like, and constitutes an improvement on the construction shown and claimed in my copending application for Letters Patent of the United States on Drilling device, filed September 27, 1944, and serially numbered 556,008, now Patent No. 2,409,525.

The principal object of the present invention is to provide a device of the character disclosed and claimed in my copending application above referred to but of improved construction and design and which will operate more efficiently.

Other objects of the invention include the provision of a drilling device comprising a body provided with a bore for receiving a drill having flutes and lands and in which the lands are relieved between their opposite edges to cooperate with the body to provide liquid passages, the body being formed for non-rotatable reception of the drill at one point in its length but being movable axially of the drill, means being provided for sealing the relief in the lands to the body, and a sleeve rotatably mounted on the body through which a cutting compound or the like may be introduced to the body and through suitable openings in the body to the relief in the lands of the drill outwardly of the seal, this much forming the broad disclosure in my pending application above identified, and in addition thereto, in accordance with the present invention, the sleeve rotatable about the body is provided with a nose portion projecting axially beyond the body for actual contact with the work being drilled; the provision of a construction as above described in which the nosepiece serves to cooperate with the slotted end of the body through which the chips are discharged from the flutes in the drill to form, in effect, a centrifugal pump aiding in the discharge of the chips and the drilling compound or other liquid employed in connection therewith; the provision of a construction as above described having a novel body construction; the provision of a construction as above described having a driving member associated with the body in a novel manner; the provision of a construction of the general type above described in which the drive between the body and the drill is through a member having an opening therein of a shape substantially fully complementary to the cross-sectional configuration of the associated drill; the provision of a construction of the general type above described

2 including a novel means for sealing the relief in the lands of the drill to the body; and the provision of a device of the type described including certain other novel features of construction.

The above being among the objects of the present invention, the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a perspective view of my improved drilling device shown with a drill in cooperative relation with respect thereto;

Fig. 2 is a partially broken, side-elevational view illustrating the application of the present invention as shown in Fig. 1 in the drilling of a hole in a piece of work;

Fig. 3 is a slightly enlarged horizontal sectional view taken on the line 3—3 of Fig. 2;

Fig. 4 is a slightly enlarged fragmentary vertical sectional view taken centrally through the device of the present invention as on the line 4—4 of Fig. 2;

Fig. 5 is a horizontal sectional view taken on the line 5—5 of Fig. 4;

Fig. 6 is a fragmentary horizontal sectional view taken on the line 6—6 of Fig. 4;

Fig. 7 is a horizontal sectional view taken on the line 7—7 of Fig. 4;

Fig. 8 is an exploded view of the two parts of the body and the driving member of the drilling device shown in the preceding views; and Fig. 9 is a view similar to Fig. 8 but showing the same parts rotated 90° about their axis from the position shown in Fig. 8.

The device of the present invention consists essentially of a body having a cylindrical bore therethrough of a diameter to relatively closely but slidably receive a drill of the intended diameter to be employed in connection therewith. The drill may have either straight flutes or may be of the conventional twist drill type having helically disposed flutes. In either case, the lands of the drill are relieved between their opposite edges so as to form flow paths for the cutting compound or the like employed in the drilling operation and means fixed with respect to the body are provided in fitted relation with respect to the relief in the lands and/or the flutes in the drill to cause the body to rotate with the drill without restricting axial sliding movement between them. Additionally, means are provided in cooperating relation between the body and the relief in the lands of the drill so as to prevent the flow of liquid fed to such relief outwardly along the relief, thus to confine the flow toward the point of the drill. The body is provided with passages leading from its exterior surface to the relief in the lands of the cooperating drill below the seal above described so as to provide for the flow of cutting compound or the like to such relief. In order to feed such cutting compound or the like to these passages, particularly in applications where the drill revolves, a sleeve or housing is provided in surrounding relation with respect to the body and rotatable with respect thereto and it in turn is provided with a passage therethrough communicating with the passages in the body. The passage in the sleeve is connected to a suitable source of cutting compound or the like.

With the construction as thus far described, in a drilling operation the drilling device is associated with a suitable drill, the drill brought into contact or approximate contact with the work, the drilling device also brought into contact with the work, drilling compound or the like is fed through the sleeve to the reliefs in the lands of the drill, and the drill is rotated and fed into the work. The cutting compound or the like flows through the reliefs in the lands toward the point of the drill and is confined thereto by the fit between the unrelieved portions of the lands and the bore of the body. As the drill penetrates the work, the walls of the bore being drilled also serve to seal the reliefs in the lands from the flutes and, consequently, cause the cutting compound to be forced down through the reliefs in the lands towards the point of the drill from which it escapes to the flutes of the drill at the point, carrying the chips being cut up the flutes with it to the drilling device from which the cutting compound and the chips escape through suitable holes or slots cut in the body in registry with the flutes.

Thus, in this type of construction, the reliefs in the lands in cooperation with the bore of the body and the bore being drilled serve the same purpose as oil holes in a conventional oil hole drill, but in this case and particularly in the case of smaller size drills, the cross-sectional area of the passage provided for the flow of the cutting compound may be made much larger than the cross-sectional area of the oil holes of a conventionally formed oil hole drill of the same size so that a greater amount of cutting compound may be fed to the point of the drill with all of the attendant advantages. Furthermore, the cutting compound in flowing down the bore being drilled is in direct contact with the walls of the bore being drilled over the full length thereof and serves to extract heat from the work as well as from the drill.

The above description and explanation is equally applicable to the construction shown and described in my copending application, above identified, as it is to the present invention. The present invention constitutes an improvement over the construction shown and described in my copending application, above identified, because of the following described differences in construction.

In the construction shown in my prior application above identified the body itself directly contacts the work, or the jig in which the work is held. Because of the fact that the body rotates with the drill this means there is rubbing friction between the body and the work, or the jig in which the work is mounted, during the drilling operation. In accordance with the present invention the sleeve which surrounds the body and through which the cutting compound or the like is introduced is provided with a nosepiece through which the contact between the drilling device and the work, or the jig for the work, is made. Inasmuch as the sleeve is relatively stationary and the body rotates within it, this eliminates the objectionable feature above referred to. Additionally, this nosepiece so cooperates with the slotted lower end of the body as to form a housing for such slotted end of the body which thereby serves in the nature of a centrifugal pump which constantly acts on the cutting compound and the chips in the flutes of the drill to draw the same from such flutes and discharge them from the drilling device. This feature, of course, materially enhances the efficiency of the device.

Additionally, in accordance with the present invention, the drive between the body and the drill includes a plate member having an opening therein which is provided with an opening therethrough for reception of the drill which is preferably complementary to the cross-sectional configuration of the drill so that driving engagement occurs between the plate and the drill not only through the relief in the lands but also through the flutes of the drill, thus providing ample driving force with a minimum of friction regardless of the cross-sectional configuration of the flutes and/or the reliefs in the lands of the drill.

Another feature of the present invention resides in the manner of securing the driving plate to the body. In accordance with the present invention, the body is made in two axially separable sections which have telescopic engagement with each other and are formed to receive the driving plate between them in rotatably fixed relation without the need of any extraneous securing means. This is an improvement over my prior construction in which screws were employed to hold the driving member in position.

An additional feature of the present invention is in connection with the employment of rubber blocks between the reliefs in the lands of the drill and the body to seal such lands against the escape of the cutting compound from the body away from the point of the drill, such rubber blocks providing an equally efficacious and much more simple sealing means than that disclosed in my prior application above identified.

Referring now to the accompanying drawings and particularly to Fig. 4, the body above referred to is indicated generally at 10, the sleeve at 12 and the nosepiece at 14, the body 10, as best brought out in Figs. 4, 8 and 9 comprises an upper portion or section 16 and a lower portion or section 18. The upper portion or section 16 is of generally inverted cup-shaped conformation, the upper end wall of which is provided with a central axial opening 20 therein of a size to relatively closely but slidably receive the cooperating drill 22 therein. As previously mentioned, the drill 22 is shown as of a twist drill type with a relatively steep helix angle to better assist in ejecting the chips from the bore being drilled in the workpiece such as that indicated at 24 in the workpiece 26 in Fig. 2. The reliefs in the lands may be of any suitable cross-sectional conformation, that shown by way of illustration being that covered in my United States Patent No. 2,370,706 granted March 6, 1945. Adjacent its lower edge, the section 16 is provided with a peripheral groove 28 which forms a distributing channel for the cutting compound or other liquid to be employed in a drilling operation, and one or more radial holes 30 drilled radially through the walls thereof centrally of the groove 28. As many holes 30 are provided as there are reliefs in the lands of the drill, in the present case two, inasmuch as the drill shown is provided with two lands 32 and two flutes 34, both lands 32 being relieved between their edges as at 36. Where, as in the case shown, the reliefs 36 and the lands 32 are diametrically opposed to each other, then, of course, the holes 30 are diametrically opposed to each other.

The lower section 18 of the body 10 comprises a sleeve like portion having a central bore 38 of the size to closely but slidably receive the drill 22 therein, and its upper end is relatively closely telescopically received within the upper section 16 in concentric relation with respect thereto. Intermediate its ends, it is provided with a peripheral flange 40 which, as brought out in Figs. 8 and 9, has its upper portion flatted off as at 42 on diametrically opposite sides for a purpose which will hereinafter be explained. Its lower end is slightly reduced in diameter as best brought out in Fig. 9, and such lower end is provided with slots or notches 44 for the escape of cutting compound and chips fed thereto from the flutes of the drill. In this respect, it will be appreciated that there are as many notches or slots 44 as there are flutes in the drill to be employed in conjunction therewith, and the slots or notches 44 are so angularly related with respect to the holes 30 that when the holes 30 are maintained in alignment with the reliefs 36 in the drill, the slots or notches 44 are maintained in alignment with the flutes 34.

The depth of the bore 46 in the section 16 is equal to the distance from the top of the section 18 to the bottom edge of the flats 42. The bottom end of the section 16 is milled out or otherwise suitably formed to provide a diametrical groove 48, the width of which is equal to or very slightly greater than the distance between the flats 42 of the section 18, and the depth of which is substantially equal to or slightly greater than the depth of the flats 42. Thus, when the upper end of the section 18 is projected into the bore 46 of section 16 which it closely but slidably fits, the upper section 16 is rotated relative to the lower section 18 until the flatted portion of the flange 40 is received in the groove 48 of the upper section, upon which the two sections are moved axially to the limit of their positions, which thus non-rotatably locks these two sections together. In such case, inasmuch as the diameter of the flange 40 is equal to the diameter of the section 16, these two cooperate to provide a cylindrical peripheral portion of the same diameter.

In order to lock the body 10 for equal rotation with the drill 22 or its equivalent, a plate member 50, best brought out in Fig. 6 is employed. The plate member 50 is made from a piece of flat stock and is centrally provided with an opening 52 therethrough which is of a shape to non-rotatably receive the drill. Broadly only this is necessary, but in accordance with a more limited phase of this invention the opening 52 is complementary to the cross-sectional configuration of the drill 22 which relatively closely but slidably receives it. Inasmuch as very little effort is required to rotate the body 10 with the drill 22, or its equivalent, the driving plate 50 may be made relatively thin.

In order to non-rotatably lock the driving plate 50 to the body 10, the plate 50, as best brought out in Fig. 6, is made in the form of a metal disk, of the same diameter as the upper end of the section 18, having two diametrically opposite sides thereof flatted off as at 54. The upper end of the body section 18, as best brought out in Figs. 6, 8 and 9, is diametrically grooved as at 56 to a width corresponding to the width of the driving plate 50 across the flats 54, so as to relatively closely but removably receive the driving plate 50 therein, and for a depth substantially equal to the thickness of the driving plate 50. The diametrical distance across the circular edge portions of the driving plate 50 being equal to the diameter of the upper portion of the section 18, when the driving plate 50 is received in the groove 56 of the section 18 the upper end of the section 18 with the driving plate 50 therein may be projected into the bore of the upper section 16. Inasmuch as the upper end of the section 18 substantially abuts the shoulder formed between the bores 20 and 46 of the upper section 16 when these sections are assembled together, it will be appreciated that the driving plate 50 is thereby axially maintained within the groove 56. Preferably, the upper end of the bore 46 is radially relieved as at 58 so as to allow the driving plate 50 some degree of endwise shifting movement when assembled to the body so as to insure centering of the opening 52 with the bores 20 and 38 of the two body sections. The driving plate 50 thus being non-rotatably fixed with respect to the body section 18 and the body section 16 being non-rotatably associated with the body section 18, it will be appreciated that both body sections and the driving plate in assembly form a unit which is constrained for equal rotation with the drill 22 or its equivalent.

In my prior patent above identified, two different means are disclosed for sealing the joint between the body and the relief in the lands against the escape of cutting compound or the like upwardly towards the shank of the drill. One of these means consists of a flexible flap carried by the body and pressed into the relief of each land by the pressure of the cutting compound or the like introduced into the device. The other comprises a metal ball slidably received in a radial opening in the body and pressed into engagement with a complementarily sectioned relief in the land by the fluid pressure of the cutting compound. The first of the above described sealing means was difficult to apply and the second described form not too efficient. Accordingly, a simpler and more efficient form of sealing device is disclosed in connection with the present device and this will now be described.

The upper end of the body section 18 is downwardly slotted from its upper face and radially through the wall thickness thereof, as at 60. The slots 60 equal in number and angular spacing to the lands in the drill employed. Where the drill is a straight fluted drill, then, of course, the slots 60 will be parallel to the axis of the body but where, as in the case shown, the drill is a twist drill with helically arranged flutes and lands, then the slots 60 are arranged at the same angle to the axis of the body as the flutes and lands are arranged to the axis of the drill, and this arrangement is shown by way of illustration.

The slots 60 extend axially downwardly in the body section 18 to a point in radial alignment with the holes 30 when the sections 16 and 18 are in properly assembled relationship. The slots 60 are so arranged angularly of the body section 18 that their lower ends lie in radial alignment with the openings 30 when the flats 42 are received in the groove 48. This alignment is brought out in Fig. 5. A block 62 of resilient material and preferably rubber, either natural or synthetic, but preferably of a suitable synthetic type resistant to the action of the particular cutting compound employed in a drilling operation, is fitted into the upper portion of each slot 60. As brought out in Fig. 7, the radially outer faces of the blocks 62 are preferably curved into conformance with the curvature of the bore 46 of the body section 16 and their inner ends are shaped for complementary reception in the reliefs 36 of the lands 32 of the drill 22. The radial dimensions of the blocks 62 are preferably such that the blocks 62 are slightly radially compressed when the drill 22 is projected through the drilling device so that the blocks 62 are not only sealed with respect to the sides of the slots 60 but are sealed against the surfaces of the reliefs 36.

The blocks 62, as best brought out in Fig. 8, stop short of the lower ends of the slots 60 so as to leave such lower ends clear and unobstructed for the free flow of cutting compound through the openings 30 and through the lower portions of the slots 60 to the reliefs 36 axially of the drill towards the point thereof from the blocks 62. It might be noted, and as best brought out in Fig. 8, that where a two fluted drill is employed, the slots 60 are preferably extended from the bottom of the groove 56 provided in the upper end of the section 18 for reception of the driving plate 50 and, as also brought out in this view, the upper ends of the slots 60 are preferably laterally widened as at 64 and the upper ends of the block 62 are complementarily outwardly flanged and their upper surfaces are shaped to be flush with the bottom of the groove 56. This outward flanging of the upper ends of the block 62 serves as a means for anchoring such upper ends between the driving plate 50 and the upper end of the body section 18 and thus maintain the position of the blocks 62 axially of the body 10.

In order to enable a cutting compound to be introduced through the openings 30 and the lower ends of the slots 60 to the reliefs 36 in the drill 22, and particularly where the drill is mounted for rotation and the work fixed as differentiated from those constructions in which the work rotates and the drill is held against axial rotation, it is necessary to provide a sleeve rotatably surrounding the body 10 and which may therefore be maintained against rotation and through which a cutting compound may be fed. This is the sleeve 12 previously referred to and it will be noted from an inspection of Fig. 4 that its bore is of such diameter as to relatively closely but freely rotatably receive the body 10 therein. While in the broader aspects of the invention it may be mounted upon the body 10 in any suitable manner, in the present case it is provided with an integral radially inwardly directed annular flange 70 at its lower end of a diameter to relatively closely but rotatably receive the lower end portion of the body section 18 therein. The lower outer edge of the flange 40 of the body section 18 is cut away to provide a stepped surface 72 in which a plurality of ball bearings 74 are received, and which cooperate with the bore of the sleeve 12 and the upper face of the flange 70 to form a pair of opposed bearings races for the ball 74. The upper end of the body section 16 is also stepped as at 76 to form a race on the body section 16 for reception of a similar series of ball bearings 78. The balls 78 bear against the bore of the sleeve 12 and also against the inner surface of a cap member 80 which is threaded upon the upper end of the body sleeve 12 as indicated in Fig. 4. The dimensions of the parts are such that the flange 70 substantially bears at its radially inner end against the lower face of the flange 40 radially inwardly of the stepped portion 72, and the cap 80 substantially bears against the upper end of the body section 16, only sufficient clearance remaining so as to permit free rotation of the body 10 with respect to the sleeve 12. These fits are primarily relied upon to prevent leakage of the cutting compound between the sleeve 12 and the body 10. It will be appreciated that a moderate amount of leakage at these points will be of no moment as the cutting compound will ordinarily flood both the work and the device of the present invention during operation and the volume of cutting compounds supplied to the device will be little affected if any by the amount of cutting compound that may leak past these cooperating surfaces.

In order to introduce the cutting compound through the sleeve 12 to the openings 30 and particularly to the groove 28 which communicates with the openings 30, the sleeve 12, as best brought out in Figs. 1 and 5, is provided with a radial opening 82 therethrough which, as brought out in Figs. 2 and 5 is threaded for reception of the inner end of a short nipple or pipe section 84 which may be connected by means of flexible holes such as 86 or the like to a suitable source of cutting compound or other liquid under the desired pressure. As brought out in Fig. 4, the sleeve 12 in lateral alignment with the opening 82 is internally provided with an annular groove 88, the groove 88 thus being in matched and opposed relation with respect to the groove 28 in the body section 16. Thus, the cutting compound introduced through the opening 82 is communicated through 360° with the groove 28 from which the openings 30 project inwardly through the upper body section 16 in radial alignment with the lower ends of the slots 60 in the inner body section 16, the latter of which are maintained in alignment with the reliefs 36 in the lands 32 as previously described.

As previously mentioned, in my copending application above referred to the drilling device was preferably constantly maintained in contact with the work being drilled, or the jig in which the work was supported, preferably by spring means, and the body of the device was in actual contact with such work or jig and consequently, rotated relative to it. Wear was therefor engendered between the drilling device and the work or jig. In the device of the present invention this wear is obviated by the use of the nosepiece 14. As best brought out in Fig. 4, the nosepiece 14 comprises a hollow member, the upper end of which is suitably secured to the lower end of the sleeve 12. While the nosepiece 14 may be secured to the sleeve 12 in any suitable manner as, for instance, by a threaded connection or the like, in the particular case shown it is assumed to have a press fit thereon and is axially applied against a shoulder 90 formed exteriorly on the sleeve 12, thereby definitely positioning the nosepiece 14 with respect to the sleeve 12. The lower end of the nosepiece 14, which is reduced in size and joined to the upper end by a frusto-conical portion, is provided with a bore 92 in which the drill 22 is relatively closely but freely rotatably received. The nosepiece 14 is also provided with one or more openings 94 therein for the escape of the cutting compound and chips discharged from the flutes 34 during the drilling operation.

The lower end of the body section 16 and the nosepiece 14 are formed to provide a relatively close fit but without materially restricting the freely rotatable relation between the body 10 and the sleeve 12 and nosepiece 14, so as to provide a proper seal between these parts to prevent the cutting compound which is being fed down the reliefs 36 in the lands 32 to the work from escaping at this point. While any suitable fit may be provided between these parts that shown by way of illustration is as follows. The lower end of the body section 18 is provided with a frusto-conical surface 96 complementary to the frusto-conical inner surface 98 of the nosepiece 14, and these parts are so arranged that when the device is assembled together, as illustrated in Fig. 4, the surface 98 substantially abuts the surface 96.

Thus, in the construction as described, the device of the present invention is projected axially against the work, or jig which supports the work, so as to prevent the cutting compounds in the reliefs 36 from escaping between the end of the nosepiece 14 and the work or jig during a drilling operation. Preferably, some spring means is provided for this purpose, as for instance in the manner illustrated in my copending application above identified. Actual contact between the device of the present invention and the work or jig is not essential for proper operation of the device, however, as it has been found that even though the device of the present invention may be spaced at as much as one-quarter of an inch from the work or work holding jig, the cutting compound in flowing through the reliefs 36 has a tendency to adhere the reliefs and will jump such a gap where it is unconfined except by the walls of the reliefs without unduly lessening either the flow of the cutting compound to the tip of the drill or the pressure of the compound. In any case with the preferred arrangements in which the nosepiece 14 actually contacts the work or the work holding jig, it will be appreciated that there will be no relative rotation between the nosepiece and the work or jig which will tend to set up any wear between these parts.

Perhaps a more important result of adding the nosepiece 14 is the effect of the centrifugal action of the body 10 through the slots 44 in ejecting the cutting compound in the slots from the bore being drilled. In such case, the slotted lower end of the body section 18 serves in the nature of a centrifugal pump rotor and the nosepiece 14 serves in the nature of a casing for such rotor. The result is that a relatively efficient centrifugal pump is produced whose inlet is constantly exposed to the flutes 34 of the drill 22 and therefore tends to create a suction which is exerted through the flutes 34 to the point of the drill. Such suction tends to withdraw the cutting compound from the bore being drilled along with the chips being cut in the bore and ejecting them from the device through the openings 94 in the nosepiece 14.

It will be appreciated that in any drilling operation there are two features which are of material importance in determining the speed at which the drilling operation may be carried on. One of these is the ability to prevent the point of the drill from being heated to such an extent as to break down its cutting edges, and the other, which is particularly important in drilling deep holes, is the ability to remove the chips from the bore so as to prevent these from becoming packed and jammed between the drill and the bore, not only heating up the drill and the work itself but endangering breakage of the drill. Because of the fact that the device of the present invention enables unusual quantities of cutting compound to be projected to the point of the drill, as compared to ordinary oil hole drills, the fact that this cutting compound is in direct contact with the walls of the bore being drilled and therefore prevents the work as well as the drill from becoming heated, and because of the ability to rapidly discharge the chips from the bore and prevent them from becoming packed and jammed between the drill and the work, both because of the added amount of cutting compound capable of being employed and the suction effect on the flutes of the drill by the centrifugal pumping action above described, actual tests show that holes may be drilled at a speed and a feed with the device of the present invention at rates far above those possible with conventional oil hole drills and at rates that have heretofore been commercially impractical.

Formal changes may be made in the specific embodiment of the invention described without departing from the spirit or substance of the broad invention, the scope of which is commensurate with the appended claims.

I claim:

1. In a drilling device of the class wherein there is a body having a central bore therethrough adapted to closely but slidably receive a drill therein which drill is provided with reliefs in the lands thereof, means are provided for cooperating between the body and the drill to cause them to be non-rotatably associated with each other, the body is provided inwardly of its forward end with openings aligned with the reliefs of the drill when the latter is received therein, said body is provided with passages therethrough at its forward end aligned with the flutes of the drill when the latter is received therein for the escape of chips or the like, and a sleeve-like member rotatably surrounds the body and is provided with a passage therethrough for introducing a liquid therethrough to the openings in the body leading to the reliefs in the lands of the drill, the combination with said sleeve-like member of a nosepiece carried thereby, said nosepiece substantially abutting the forward end of said body and projecting beyond said forward end whereby to prevent direct contact between said body and the piece of work being operated upon by said drill.

2. In a drilling device of the class wherein there is a body having a central bore therethrough adapted to closely but slidably receive a drill therein which drill is provided with reliefs in the lands thereof, means are provided for cooperating between the body and the drill to cause them to be non-rotatably associated with each other, the body is provided inwardly of its forward end with openings aligned with the reliefs of the drill when the latter is received therein, said body is provided with passages therethrough at its forward end aligned with the flutes of the drill when the latter is received therein for the escape of chips or the like, and a sleeve-like member rotatably surrounds the body and is provided with a passage therethrough for introducing a liquid therethrough to the openings in the body leading to the reliefs in the lands of the drill, the combination with said sleeve-like member of a hollow nosepiece fixed with respect to said sleeve-like member in surrounding relationship with respect to the forward end of said body and provided with passages therethrough for the escape of chips therefrom, whereby said nosepiece forms a pump casing, the rotor of which consists of said forward end of said body.

3. In a drilling device of the class wherein there is a body having a central bore therethrough adapted to closely but slidably receive a drill therein which drill is provided with reliefs in the lands thereof, means are provided for cooperating between the body and the drill to cause them to be non-rotatably associated with each other, the body is provided inwardly of its forward end with openings aligned with the reliefs of the drill when the latter is received therein, said body is provided with passages therethrough at its forward end aligned with the flutes of the drill when the latter is received therein for the escape of chips or the like, and a sleeve-like member rotatably surrounds the body and is provided with a passage therethrough for introducing a liquid therethrough to the openings in the body leading to the reliefs in the lands of the drill, the combination with said sleeve-like member of a hollow nosepiece fixed with respect thereto, said nosepiece having a tapered inner surface arranged in substantially abutting relation with the forward end of said body and extending axially therebeyond.

4. In a drilling device of the class wherein there is a body having a central bore therethrough adapted to closely but slidably receive a drill therein which drill is provided with reliefs in the lands thereof, means are provided for cooperating between the body and the drill to cause them to be non-rotatably associated with each other, the body is provided inwardly of its forward end with openings aligned with the reliefs of the drill when the latter is received therein, said body is provided with passages therethrough at its forward end aligned with the flutes of the drill when the latter is received therein for the escape of chips or the like, and a sleeve-like member rotatably surrounds the body and is provided with a passage therethrough for introducing a liquid therethrough to the openings in the body leading to the reliefs in the lands of the drill, the combination with said sleeve-like member of a hollow nosepiece fixed with respect thereto in surrounding relation with respect to the forward end of said body, said nosepiece arranged in close substantially abutting but relatively rotatable relation with respect to the forward end of the body, said nosepiece projecting axially beyond said forward end of said body and being provided with a bore therein of the same size as and concentric with the bore of said body.

5. In a drilling device of the type described, a body member having a bore therethrough adapted to closely but axially slidably receive a drill therein and comprising a pair of axially separable sections non-rotatably engaging one another and providing a pair of axially opposed faces, one of said axially opposed faces having a diametrical groove therein, and a driving member confined in said groove between said faces, said driving member having an opening therethrough concentric with the bore of said body member and shaped to axially slidably but non-rotatably receive said drill therethrough.

6. In a drilling device of the type described, a body member comprising a pair of axially separable sections having aligned openings therein of a size to closely but slidably receive a drill therein, said sections having telescoping portions, the inner of said sections having a generally radially directed passage therethrough within the telescoping portion thereof, means non-rotatably associated with said body member and the drill adapted to be received thereby operable to maintain a land of such drill when received by said body member in radial alignment with said passage, and a block of resilient material confined in said passage and adapted to bear on a land of such drill, the radially outer of said telescoping portions maintaining said block of resilient material against radially outward displacement.

7. In a drilling device of the type described, a body member having a central bore therethrough adapted to closely but slidably receive a drill therein and comprising a pair of axially separable sections having axially opposed faces and telescoping portions, one of said sections having a generally axially directed slot therethrough extending from its said face, means non-rotatably associated with one of said sections adapted to slidably but non-rotatably engage such drill when received by said body member and maintain a land thereof in substantial radial alignment with said slot, the axially open end of said slot being circumferentially widened, and a block of resilient material received in said slot and having a portion complementary to said widened end of said slot received therein and maintained therein by the other of said faces, said block being adapted to bear against a land of said drill when the latter is received by said body member.

8. In a drilling device of the type described, a body member comprising a pair of axially separable sections having aligned bores therein adapted to closely but slidably receive a drill therein, said sections having telescoping portions including axially opposed faces, the radially inner of said portions having a diametrical slot in the end thereof, a driving member non-rotatably received in said slot and confined therein by the other of said faces, said driving member having an opening therethrough in alignment with the bores in said sections and shaped to slidably but non-rotatably receive said drill, said inner of said portions having a generally axially directed slot therethrough extending from said face thereof, said slots being angularly spaced from each other about the axis of said body member in accordance with the angular spacing of the lands of said drill and being so related to said driving member as to be maintained in radial alignment with said lands of said drill, and a block of resilient material received in each of said slots, the radially inner faces of said blocks being adapted to be pressed against said lands of said drill and being held against radially outward displacement in said slots by the outer of said telescoping portions.

9. In a drilling device of the type described, a body member comprising a pair of axially separable sections having aligned bores therein adapted to closely but slidably receive a drill therein, said sections having telescoping portions including axially opposed faces, the radially inner of said portions having a diametrical slot in the end thereof, a driving member non-rotatably received in said slot and confined therein by the other of said faces, said driving member having an opening therethrough in alignment with the bores in said sections and shaped to slidably but non-rotatably receive said drill, said inner of said portions having a generally axially directed slot therethrough extending from said face thereof, said slots being angularly spaced from each other about the axis of said body member in accordance with the angular spacing of the lands of said drill and being so related to said driving member as to be maintained in radial alignment with said lands of said drill, and a block of resilient material received in the axially outer end of each of said slots, each of said blocks having means thereon cooperating with the corresponding of said sections maintaining said blocks against relative axial movement with respect thereto, the radially inner faces of said blocks being adapted to be pressed against the lands of said drill and said blocks being maintained against radial outward displacement by the outer of said telescoping portions, the axially inner ends of said slots being unrestricted by said blocks and the outer of said telescoping sections having openings therethrough in radial alignment with the axially inner ends of said slots.

10. In a drilling device of the type described, a body member comprising a pair of axially separable sections having aligned bores therein adapted to closely but slidably receive a drill therein, said sections having telescoping portions including axially opposed faces, the radially inner of said portions having a diametrical slot in the end thereof, a driving member non-rotatably received in said slot and confined therein by the other of said faces, said driving member having an opening therethrough in alignment with the bores in said sections and shaped to slidably but non-rotatably receive said drill, said inner of said portions having a generally axially directed slot therethrough extending from said face thereof, said slots being angularly spaced from each other about the axis of said body member in accordance with the angular spacing of the lands of said drill and being so related to said driving member as to be maintained in radial alignment with said lands of said drill, a block of resilient material received in the axially outer end of each of said slots, each of said blocks having means thereon cooperating with the corresponding of said sections maintaining said blocks against relative axial movement with respect thereto, the radially inner faces of said blocks being adapted to be pressed against the lands of said drill and said blocks being maintained against radial outward displacement by the outer of said telescoping portions, the axially inner ends of said slots being unrestricted by said blocks and the outer of said telescoping sections having openings therethrough in radial alignment with the axially inner ends of said slots, a sleeve rotatably surrounding said body member, means maintaining said sleeve against relative axial movement with respect to said body member, a nosepiece carried by said sleevelike member in fixed relation with respect thereto, said nosepiece being hollow and extending into surrounding relation with respect to the forward end of said body and axially beyond said body, said forward end of said body having radially directed passages therethrough maintained in radial alignment with the flutes of said drill when the latter is received by said body for the escape of chips from said flutes and said nosepiece being provided with passages therethrough for the escape of chips therefrom, said forward end of said body with said passages therethrough serving as a rotor for a centrifugal pump and said nosepiece serving as a casing for said pump, whereby to create a suction effect on the flutes of said drill during rotation of said drill and body.

RUDOLF W. ANDREASSON.

REFERENCES CITED

The following references are of record in the file of this patent:

UNITED STATES PATENTS

| Number | Name | Date |
|---|---|---|
| 1,027,520 | Blood | May 28, 1912 |
| 1,109,836 | Hanson | Sept. 8, 1914 |
| 2,231,864 | Abel | Feb. 18, 1941 |
| 2,301,151 | Spievak | Nov. 3, 1942 |
| 2,409,525 | Andreasson | Oct. 15, 1946 |